US011078890B2

(12) United States Patent
Øllgaard

(10) Patent No.: US 11,078,890 B2
(45) Date of Patent: Aug. 3, 2021

(54) OSCILLATING DAMPER FOR DAMPING TOWER HARMONICS

(71) Applicant: ENGISO ApS, Esbjerg (DK)

(72) Inventor: Børge Øllgaard, Esbjerg (DK)

(73) Assignee: Engiso ApS, Esbjerg (DK)

( * ) Notice: Subject to any disclaimer, the term of this patent is extended or adjusted under 35 U.S.C. 154(b) by 0 days.

(21) Appl. No.: 16/417,423

(22) Filed: May 20, 2019

(65) Prior Publication Data
US 2019/0360471 A1    Nov. 28, 2019

(30) Foreign Application Priority Data

May 22, 2018 (DE) .................... 20 2018 102 837.5
May 22, 2018 (ES) ............................ ES201830731U

(51) Int. Cl.
E04D 13/18    (2018.01)
F03D 80/80    (2016.01)
F16F 15/02    (2006.01)
E04H 12/00    (2006.01)
F03D 13/20    (2016.01)

(52) U.S. Cl.
CPC ............. *F03D 80/88* (2016.05); *E04H 12/00* (2013.01); *F03D 13/20* (2016.05); *F16F 15/02* (2013.01); *F05B 2260/964* (2013.01); *F16F 2232/00* (2013.01); *F16F 2238/04* (2013.01)

(58) Field of Classification Search
None
See application file for complete search history.

(56) References Cited

U.S. PATENT DOCUMENTS

| 3,568,805 A | 3/1971 | Reed, III |
| 7,928,593 B2 * | 4/2011 | Ollgaard ................. F03D 80/00 290/44 |
| 2010/0314883 A1 | 12/2010 | Ollgaard |
| 2012/0267207 A1 | 10/2012 | Kawabata et al. |
| 2014/0223841 A1 * | 8/2014 | Aujaghian .............. E04H 9/021 52/167.8 |

(Continued)

FOREIGN PATENT DOCUMENTS

| DK | 142426 B | 5/1981 |
| DK | 153003 B | 6/1988 |
| GB | 2153463 A | 8/1985 |

OTHER PUBLICATIONS

DE3215428A1 Claims, Nov. 1983 (Year: 1983).*
DE3215428A1 Description, Nov. 1983 (Year: 1983).*

*Primary Examiner* — Basil S Katcheves
(74) *Attorney, Agent, or Firm* — Dykema Gossett PLLC

(57) ABSTRACT

An oscillation damper may comprise a suspension having a suspension length. The oscillation damper may comprise a pendulum which may be suspended by the suspension and may have a pendulum mass. The pendulum may comprise a fixed part which may have a side face. The pendulum may comprise a slideable part for collision with a movement limiter. The slideable part may be a substantial portion of the pendulum mass. The slideable part may comprise one or more stacked plates which may be positioned on the fixed part, and the one or more plates may extend beyond the side face. The oscillation damper may comprise a movement limiter. The movement limiter may face the pendulum.

13 Claims, 3 Drawing Sheets

(56) References Cited

U.S. PATENT DOCUMENTS

2015/0322923 A1* 11/2015 Konitz .................... F16F 7/116
                                                    416/144
2017/0342734 A1* 11/2017 Shimoda ................ F16F 15/02
2018/0017125 A1*  1/2018 Amdisen ............... F16F 7/1022

* cited by examiner

OSCILLATING DAMPER FOR DAMPING TOWER HARMONICS

CROSS-REFERENCE TO RELATED APPLICATIONS

This application is claims the benefit of priority to German application No. 20 2018 102 837.5, filed 22 May 2018; and to Spain application No. U201830731, filed 22 May 2018.

BACKGROUND OF THE INVENTION a. Field of the Invention

The invention concerns an oscillation damper for dampening oscillations in a tower which could be a wind turbine tower.

The invention concerns a pendulum for dampening oscillations in a wind turbine tower.

b. Background Art

The prior art pendulums for dampening of wind turbine towers, disclosed in a Danish patent, have a rubber buffer that is hit by the pendulum. In addition to extra weight, the prior art pendulums have plates for braking the movements of the pendulum. This causes the entire system to be heavier than the design with a shock absorber incorporated in the pendulum.

WO2009/068599 relates to a method for damping oscillations in a wind turbine. The damper consists of a pendulum suspended in the wind turbine. Around the pendulum there is a safety enclosure that has an opening in the top so that the pendulum can oscillate. In one embodiment, the pendulum has an upright rod around the suspension. In this embodiment, the oscillation damper has a base located on top of the safety enclosure, and on this base friction plates are stacked. When the pendulum oscillates, the rod will collide with these friction plates where friction between the individual plates will dampen the oscillation. The interaction between the rod and friction plates induces an unwanted torque of the pendulum, thereby causing the pendulum to have unwanted movement. The unwanted movement may cause the pendulum to damage the safety enclosure or pendulum. Furthermore, the friction plates increase the overall weight of the damper.

Pendulums used today for dampening wind turbine towers are constructed of a weight, and this gives off energy to the tower, either via a rubber ring, friction plates, a liquid, or hydraulic dampers.

Thus, there is a need for a new oscillation damper with no or limited unwanted movement.

Furthermore, there is a need for a new oscillation damper having a more simple design.

OBJECT OF THE INVENTION

By the invention is provided an oscillation damper of the kind mentioned in the introduction and which is provided with an increased ability for damping oscillations of a tower as the prior art, where one or more shock absorber plates are part of the mass of a pendulum.

By the invention is provided a pendulum of the kind mentioned in the introduction and which is provided the same energy for stopping the movements of the tower, where a shock absorber is part of the weight of the pendulum.

BRIEF DESCRIPTION OF THE INVENTION

An object is achieved by an oscillation damper for damping oscillations. The oscillation damper may comprise a suspension having a suspension length. The oscillation damper may comprise a pendulum which may be suspended by the suspension and may have a pendulum mass. The pendulum may comprise a fixed part which may have a side face. The pendulum may comprise a slideable part for collision with a movement limiter. The slideable part may be a substantial portion of the pendulum mass. The slideable part may comprise one or more stacked plates which may be positioned on the fixed part, and the one or more plates may extend beyond the side face. The oscillation damper may comprise a movement limiter. The movement limiter may face the pendulum.

The suspension length is the length from the pendulum to where the suspension is fixed. The suspension length determines the frequency of the pendulum. The suspension length is at present day adjusted to match the harmonic of the tower or structure such that the pendulum and the harmonic oscillate with an at least similar frequency.

The suspension length in present day wind turbine towers is between 200 mm and 18000 mm.

The suspension length in present day is towers up to 30000 mm.

The suspension length is typically 100-2000 mm when damping second harmonics.

The suspension length is typically above 2000 mm when damping first harmonics.

The suspension may be a wire, a chain, a rod or any other means capable of suspending a pendulum.

In an embodiment, the suspension length may be 10-50% or 20-30% longer than a suspension length causing the pendulum to oscillate with the same frequency as the structure or tower to be damped. Surprisingly, in small scale experiments, this has been shown to increase the damping efficiency by up to 50%.

The skilled person would expect that the small-scale experiments of an oscillation damper are scalable and that the positive damping effect would be similar for a large-scale oscillation damper.

The slideable part is a substantial portion of the pendulum mass, thereby enabling a decrease of material and mass of the entire oscillation damper. Furthermore, unwanted pendulum movement due to torque is minimized or removed as there is no external sideway force on the suspension.

The one or more stacked plates which extend beyond the side face increase energy loss of the collision due to friction between the plates and between the bottommost plate and the fixed part, when the one or more plates collide with the movement limiter.

The one or more plates may be shock absorber plates.

The one or more plates also soften the collision between the fixed part as the plates collide with the movement limiter first; thereby the pendulum has lost a substantial part of the mechanical energy when the fixed part collides with the movement limiter.

As an example the pendulum may have a total mass of 500 kg, wherein the one or more plates constitute 200 kg. Thus, the collision between the fixed part and the movement limiter can be seen as equivalent to a collision between a prior art pendulum having a mass of 300 kg and a movement limiter.

The movement limiter and the pendulum may be adapted, such that they have a maximised contact surface in a collision. This will minimise the pressure created between the movement limiter and pendulum, thereby decreasing the risk of damage.

In an aspect the one or more plates may be stacked with gradually larger horizontal extent.

This will ensure a collision which increases in discrete steps as more and more plates collide with the movement limiter, while maximising losses due to friction.

In an aspect the one or more plates may constitute 20% to 90%, 20% to 60% or 20% to 40% of the pendulum mass.

Tests have shown that a 20% to 40% mass ratio has a good dampening efficiency.

Typically the one or more plates will constitute a larger portion of the pendulum mass with decreasing suspension length as this will cause the pendulum to oscillate faster and there would be a need to soften the collision with the movement limiter into discrete collision steps.

In an aspect the fixed part comprises a top part and a bottom part connected to the top part. The one or more plates may be positioned on the bottom part.

This will ensure that the center of mass of the pendulum will be substantially the same as the center of the pendulum. This will increase the stability of the pendulum and reduce the risk of unwanted movement due to torque.

In an aspect the fixed part may have a substantially truncated conical shape. The shape will maximise a contact surface between the pendulum and the movement limiter when the movement limiter is substantially vertical and when the pendulum is suspended in a single suspension.

In an aspect the pendulum may be suspended by a plurality of suspensions and the fixed part may have a substantially cylindrical shape. The shape will maximise a contact surface between the pendulum and the movement limiter, when the movement limiter is substantially vertical.

In an embodiment the pendulum may be suspended by three suspensions. It is easy to calibrate the suspension length of each suspension such that they all lift a part of the pendulum mass.

In an embodiment the pendulum may be suspended by four, five or six suspensions. It will be gradually harder to calibrate the suspension length of each suspension such that they all lift a part of the pendulum mass. However, the pendulum movement in different directions will be more stable.

An object is achieved by a tower having at least one harmonic. The tower may comprise at least one oscillation damper for damping a harmonic.

The at least one oscillation damper may have one or more of the previously described technical features.

In an embodiment the tower may further comprise means for adjusting the suspension length if needed or if possible.

The means for adjusting the suspension length could be a rod having one end with a grip for gripping the suspension, while the other end of the rod could have a magnet for attaching the rod to the side of the tower.

The other end of the rod could also be mechanically connected to the side of the tower by screws or by any other means.

In general, the means for adjusting the suspension length is well known within the art.

It is well known that even towers having the same blueprint will have slightly different oscillation modes, thus there is a need to adjust the suspension length in-situ as it would be impossible to calculate the most optimum suspension length.

In an aspect the at least one oscillation damper may be positioned at a top-tower section for damping a first harmonic of the tower.

The first harmonic of the tower will cause the upper part of the tower to oscillate and thus the at least one oscillation damper must be positioned at the top-tower section in order to dampen the oscillation efficiently.

At present the suspension length may be in the range of 2000 mm to 18000 mm.

The suspension length may in certain cases be up to 30000 mm.

In general, the suspension length will increase with the height of the tower.

In an aspect the at least one oscillation damper is adapted for damping a second harmonic of the tower, and the at least one oscillation damper is positioned near said second harmonic oscillation of the tower.

The second harmonic oscillation of the tower will typically have maximum amplitude near a height corresponding to ¾ of the tower height. However, different tower designs may have maximum amplitude of the second harmonic at different heights.

The second harmonic of the tower will cause the middle part of the tower to oscillate and thus the at least one oscillation damper must be positioned at the mid-tower section in order to dampen the oscillation efficiently.

In this case, the suspension length could be 100 mm-2000 mm.

In an aspect the suspension length is 10-50% longer than what would correspond to the harmonic to be damped.

In an embodiment the suspension length may be 10-50% or 20-30% longer than the suspension length causing the pendulum to oscillate in opposite phase to the tower. Surprisingly, in small scale experiments, this has been shown to increase the damping efficiency of up to 50% compared to the prior art.

The skilled person would expect that the small-scale experiments of an oscillation damper are scalable and that the positive damping effect would be similar for a large-scale oscillation damper.

In present day oscillation dampers the suspension length is adjusted such that the pendulum oscillates ten times when the tower oscillates ten times.

If the suspension length is increased by 10-50% relative to the length causing the pendulum to oscillate ten times when the tower oscillates ten times, then the pendulum, as a rough example, might oscillate seven times when the tower oscillates ten times. However, the movement limiter will force the pendulum to follow the oscillations of the tower by collision, thereby increasing the damping efficiency.

In an aspect the tower is a wind turbine tower.

An object is achieved by use of an oscillation damper for damping a wind turbine tower.

In an aspect an oscillation damper may be used for damping a first harmonic of a wind turbine tower.

In an aspect an oscillation damper may be used for damping a second harmonic of a wind turbine tower.

The pendulum is designed in such a way that in the pendulum mass there is incorporated shock-absorbing plates which simultaneously yield energy to the pendulum mass, these two together draw energy out of the tower when in opposite phase, thereby providing dampening of the tower.

The pendulum is with built-in loose weight plates. These weight plates act as shock absorber when the pendulum strikes its movement limiter. The loose weight plates are part of the pendulum weight. The loose weight plates are between 20% and 40% of the pendulum weight.

According to the invention, this is achieved by the shock absorber plates having a size (diameter) greater than the pendulum itself and being part of the pendulum weight.

The loose shock absorber plates will slow down the pendulum when they strike the movement limiter, thereby braking the pendulum due to the resistance under the plates.

By dividing the shock absorber plates into several smaller plates with different sizes, the shock absorber will provide an even and soft braking as more plates come into contact with the movement limiter.

Pendulums used today for dampening wind turbine towers are constructed of a weight, and this gives off energy to the tower, either via a rubber ring, friction plates, a liquid, or hydraulic dampers, characterised by having incorporated shock absorber plates that provide weight to the pendulum at the same time, the shock absorber plates having free mobility in the pendulum and a size (diameter) larger than the pendulum itself, ensuring that the shock absorber plates strike the movement limiter before the pendulum strikes the movement limiter.

| | |
|---|---|
| Movement limiter | 1 |
| Suspension | 2 |
| Fixed part | 3 |
| Plates | 4 |
| Oscillation damper | 5 |
| Wind turbine tower | 6 |
| Tower flange | 7 |
| Platform | 8 |
| Tower section | 9 |
| Pendulum | 10 |
| Side face | 11 |
| Slideable part | 14 |
| Tower | 15 |

DETAILED DESCRIPTION OF THE INVENTION

Figure 1:
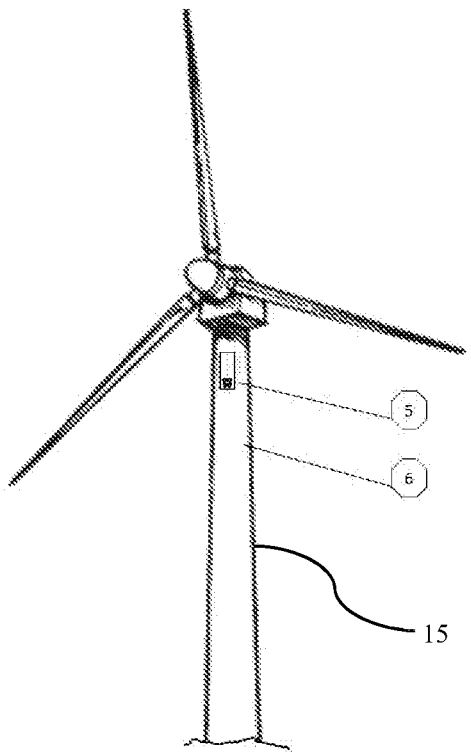
FIG. 1 shows a wind turbine tower with an oscillation damper in the tower.

FIG. 1 discloses a wind turbine tower 6, 15 with an oscillation damper 5 in the tower 6, 15. The oscillation damper 5 is positioned at a top-tower section 9 for damping the first harmonic of the wind turbine tower 6, 15.

Figure 2:
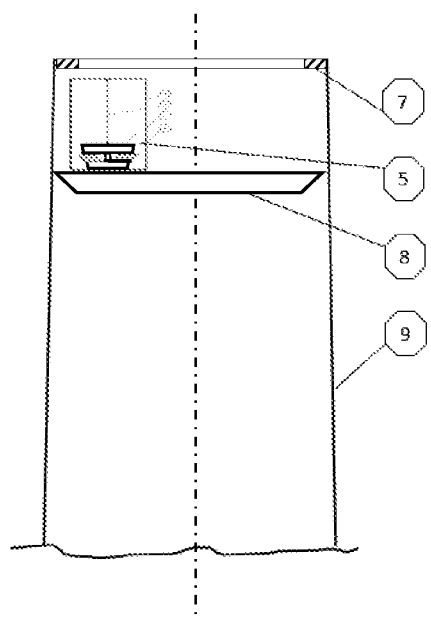
FIG. 2 shows a tower section with an oscillation damper disposed at the top of the tower section.

FIG. 2 shows a tower section 9 with an oscillation damper 5 disposed at the top of a tower section 9. The oscillation damper 5 is positioned near a platform 8, such that the oscillation damper 5 can be serviced. The tower section 9 has a tower flange 7 near the top.

This tower section 9 may be the top part of a wind turbine tower 6, thus the oscillation damper 5 will be adapted to dampen a first harmonic of the wind turbine tower 6.

This tower section 9 may be an upper middle part of a wind turbine tower 6, thus the oscillation damper 5 will be adapted to dampen a second harmonic of the wind turbine tower 6.

Figure 3:
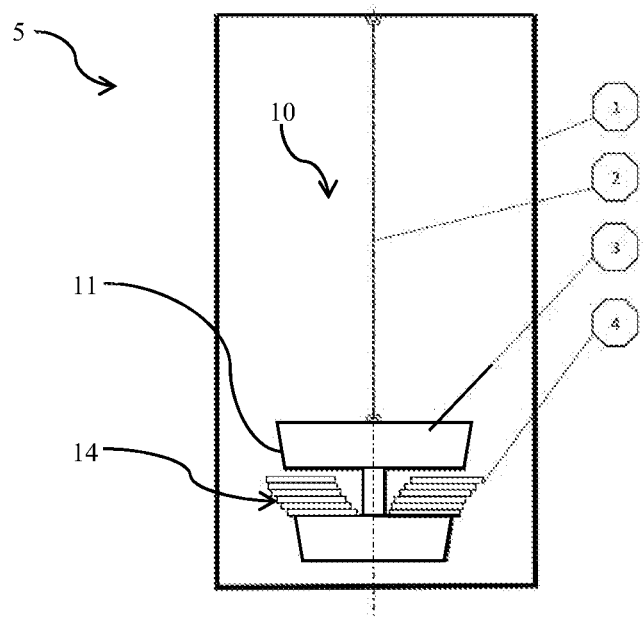
FIG. 3 is a sectional view of an embodiment of an oscillation damper where the pendulum is suspended in one suspension.

FIG. 3 is a sectional view of an embodiment of an oscillation damper 5 where the pendulum 10 is suspended in one suspension 2.

The oscillation damper 5 comprises a suspension 2 having a suspension length. The suspension length determines the frequency which is to be dampened.

The oscillation damper 5 comprises a pendulum 10 suspended by the suspension 2. The pendulum 10 has a pendulum mass. The pendulum 10 comprises a fixed part 3 having a side face 11 and a slideable part 14.

The slideable part 14 is a substantial portion of the pendulum mass such as 20-90%, 20-60% or 20% to 40% of the pendulum mass. The slideable part 14 comprises one or more stacked plates 4 which are positioned on the fixed part 3 and extend beyond the side face 11.

The oscillation damper 5 comprises a movement limiter 1 facing the pendulum 10.

The fixed part 3 has a substantially truncated conical shape. The shape will maximise the contact surface between the pendulum 10 and the movement limiter 1.

Figure 4:
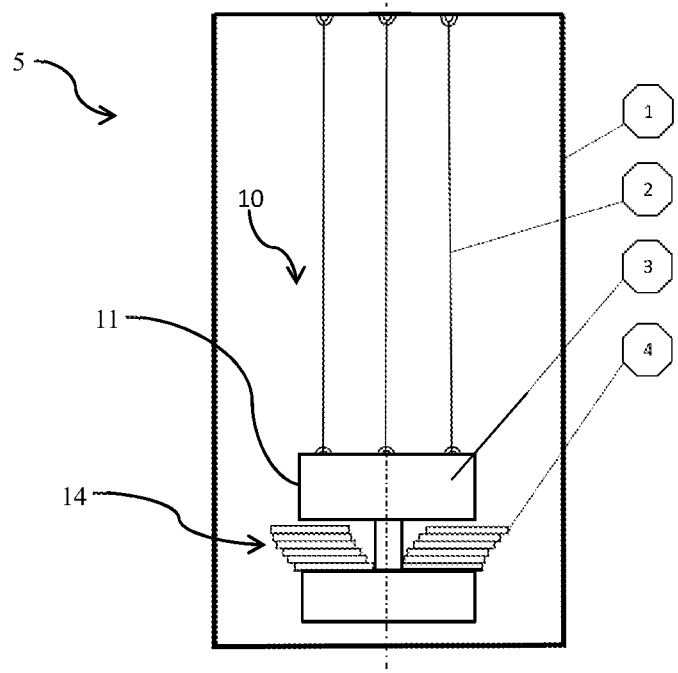
FIG. 4 is a sectional view of an embodiment of an oscillation damper where the pendulum is suspended in three suspensions.

FIG. 4 is a sectional view of an embodiment of an oscillation damper 5 where the pendulum is suspended by three suspensions 2.

The oscillation damper 5 comprises at least three suspensions 2 having a suspension length. The suspension length determines the frequency which is to be dampened.

The oscillation damper 5 comprises a pendulum 10 suspended by the suspensions 2. The pendulum 10 has a pendulum mass. The pendulum 10 comprises a fixed part 3 having a side face 11 and a slideable part 14 for collision with a movement limiter 1.

The slideable part 14 is a substantial portion of the pendulum mass such as 20-90%, 20-60% or 20% to 40% of the pendulum mass. The slideable part 14 comprises one or more stacked plates 4 which are positioned on the fixed part 3 and extend beyond the side face 11.

The oscillation damper 5 comprises a movement limiter 1 facing the pendulum 10.

The fixed part 3 has a substantially cylindrical shape. The shape will maximise the contact surface between the pendulum 10 and the movement limiter 1.

Figure 5:
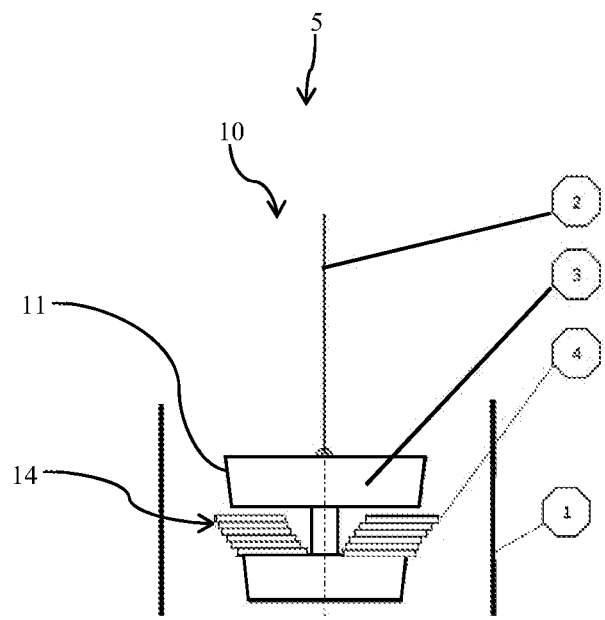
FIG. 5 shows a sectional view of another embodiment of an oscillation damper where the pendulum is suspended in one suspension.

FIG. 5 is a sectional view of another embodiment of an oscillation damper 5 where the pendulum 10 is suspended by a suspension 2.

The oscillation damper 5 comprises a suspension 2 having a suspension length. The suspension length determines the frequency which is to be dampened.

The oscillation damper 5 comprises a pendulum 10 suspended by the suspension 2. The pendulum 10 has a pendulum mass. The pendulum 10 comprises a fixed part 3 having a side face 11 and a slideable part 14 for collision.

The slideable part 14 is a substantial portion of the pendulum mass such as 20-90%, 20-60% or 20% to 40% of the pendulum mass. The slideable part 14 comprises one or more stacked plates 4 which are positioned on the fixed part 3 and extend beyond the side face 11.

The oscillation damper 5 comprises a movement limiter 1 facing the pendulum 10.

The fixed part 3 has a substantially truncated conical shape. The shape will maximise the contact surface between the pendulum 10 and the movement limiter 1.

Figure 6:
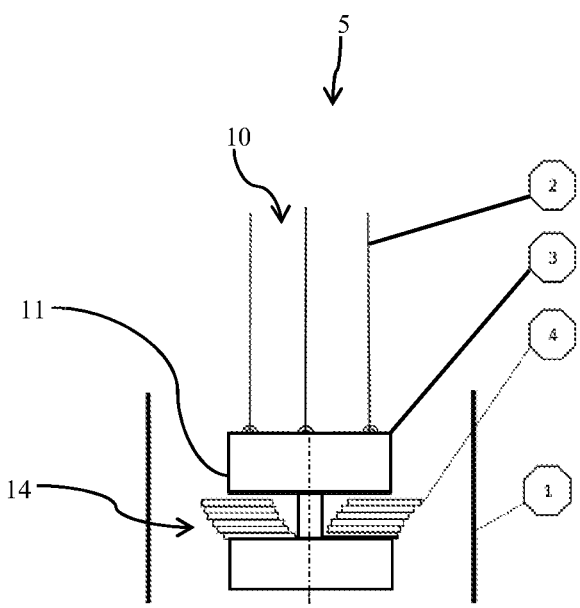
FIG. 6 shows a sectional view of another embodiment of an oscillation damper where the pendulum is suspended in three suspensions.

FIG. 6 is a sectional view of another embodiment of an oscillation damper 5 where the pendulum is suspended in three suspensions 2.

The oscillation damper 5 comprises at least three suspensions 2 having a suspension length. The suspension length determines the frequency which is to be dampened.

The oscillation damper 5 comprises a pendulum 10 suspended by the suspension 2. The pendulum 10 has a pendulum mass. The pendulum 10 comprises a fixed part 3 having a side face 11 and a slideable part 14 for collision.

The slideable part 14 is a substantial portion of the pendulum mass such as 20-90%, 20-60% or 20% to 40% of the pendulum mass. The slideable part 14 comprises one or more stacked plates 4 which are positioned on the fixed part 3 and extend beyond the side face 11.

The oscillation damper 5 comprises a movement limiter 1 facing the pendulum 10.

The fixed part 3 has a substantially cylindrical shape. The shape will maximise the contact surface between the pendulum 10 and the movement limiter 1.

As an example:

6 is a wind turbine tower. 5 is an example of disposition of an oscillation damper in the tower. 9 is a tower section where an oscillation damper is located at the top. 8 is a platform by which the oscillation damper can be serviced. 5 is an oscillation damper and 7 is a tower flange.

1 shows an movement limiter wherein the pendulum is suspended. 2 is the suspension by which the pendulum is suspended. The length of the suspension 2 can be adapted to the wind turbine tower frequency. 3 is the fixed part of the pendulum. 4 shows the disposition of the weight plates, also called shock absorber plates.

The plates 4 have different sizes and provide that the uppermost plate, which is the largest, strikes first when the pendulum 3 swings and strikes the movement limiter 1; this starts with providing a small resistance to the pendulum, and when the second plate 4 strikes, the force is increased.

What is claimed is:

1. A tower having at least one harmonic frequency, the tower comprising at least one oscillation damper for damping the at least one harmonic frequency wherein the at least one oscillation damper includes
    a suspension having a suspension length that is 10-50% longer than a length of the at least one harmonic frequency to be damped;
    a pendulum suspended by the suspension, the pendulum including a pendulum mass, and a fixed part having a planar side face and a planar upper face;
    a movement limiter facing the pendulum; and
    wherein the pendulum further includes a slideable part positioned on the planar upper face, the slideable part and the planar side face configured and arranged for collision with the movement limiter, the slideable part being a substantial portion of the pendulum mass and including one or more stacked plates positioned on the planar upper face of the fixed part and extending beyond the planar side face, wherein the one or more stacked plates are displaceable relative to the planar upper face.

2. The tower according to claim 1, characterised in that the one or more stacked plates are stacked with gradually larger horizontal extent.

3. The tower according to claim 1, characterised in that the one or more stacked plates constitute 20% to 90% of the pendulum mass.

4. The tower according to claim 1, characterised in that the fixed part includes a top part and a bottom part, the bottom part connected to the top part, and wherein the one or more stacked plates are positioned on the bottom part.

5. The tower according to claim 1 characterised in that the at least one oscillation damper is positioned at a top-tower section, the at least one oscillation damper is configured and arranged for damping a first harmonic frequency of the tower.

6. The tower according to claim 5, characterised in that the at least one oscillation damper is configured and arranged for damping a second harmonic frequency of the tower and is positioned near a second harmonic oscillation of the tower.

7. The tower according to claim 1, wherein the tower is a wind turbine tower.

8. The tower according to claim 1, wherein the one or more stacked plates constitute 20% to 60% of the pendulum mass.

9. The tower according to claim 1, wherein the one or more stacked plates constitute 20% to 40% of the pendulum mass.

10. A tower having at least two harmonic frequencies, the tower comprising at least one oscillation damper configured and arranged for damping the second harmonic frequency of the tower, and is positioned near a second harmonic oscillation of the tower, the at least one oscillation damper includes
    a suspension having a suspension length;
    a pendulum suspended by the suspension, the pendulum including a pendulum mass, and a fixed part having a planar side face and a planar upper face;
    a movement limiter facing the pendulum; and
    wherein the pendulum further includes a slideable part positioned on the planar upper face, the slideable part and the planar side face configured and arranged for collision with the movement limiter, the slideable part being a substantial portion of the pendulum mass and including one or more stacked plates positioned on the planar upper face of the fixed part and extending beyond the planar side face, wherein the stacked plates are displaceable relative to the upper face.

11. The tower according to claim 10, characterised in that the one or more stacked plates are stacked with gradually larger horizontal extent.

12. The tower according to claim 10, characterised in that the one or more stacked plates constitute 20% to 90% of the pendulum mass.

13. The tower according to claim 10, characterised in that the fixed part includes a top part and a bottom part connected to the top part, and wherein the one or more stacked plates are positioned on the bottom part.

* * * * *